US012595780B2

(12) United States Patent
Johnson

(10) Patent No.: US 12,595,780 B2
(45) Date of Patent: Apr. 7, 2026

(54) JOHNSON EJECTOR WATER AND POWER GENERATOR

(71) Applicant: Lonnie G. Johnson, Atlanta, GA (US)

(72) Inventor: Lonnie G. Johnson, Atlanta, GA (US)

( * ) Notice: Subject to any disclaimer, the term of this patent is extended or adjusted under 35 U.S.C. 154(b) by 0 days.

(21) Appl. No.: 19/034,152

(22) Filed: Jan. 22, 2025

(65) Prior Publication Data

US 2025/0257711 A1 Aug. 14, 2025

Related U.S. Application Data

(60) Provisional application No. 63/626,185, filed on Jan. 29, 2024.

(51) Int. Cl.
*F03B 17/06* (2006.01)

(52) U.S. Cl.
CPC ........ *F03B 17/062* (2013.01); *F05B 2210/13* (2013.01); *F05B 2210/18* (2013.01); *F05B 2220/602* (2013.01); *F05B 2220/706* (2013.01); *F05B 2260/205* (2013.01)

(58) Field of Classification Search
CPC ................ F03B 17/062; F05B 2210/13; F05B 2210/18; F05B 2220/602; F05B 2220/706; F05B 2260/205
See application file for complete search history.

(56) References Cited

U.S. PATENT DOCUMENTS

| | | | | |
|---|---|---|---|---|
| 11,489,185 | B2 * | 11/2022 | Johnson | H01M 8/1004 |
| 11,705,777 | B2 * | 7/2023 | Kim | H02K 7/025 290/55 |
| 2002/0172844 | A1 | 11/2002 | Ito | |
| 2015/0211132 | A1 | 7/2015 | MacKinnon | |
| 2020/0316518 | A1 * | 10/2020 | Johnson | B01D 53/263 |
| 2023/0011620 | A1 | 1/2023 | Johnson | |

* cited by examiner

*Primary Examiner* — Joseph Ortega
(74) *Attorney, Agent, or Firm* — Baker Donelson Bearman Caldwell & Berkowitz, PC

(57) ABSTRACT

An atmospheric water vapor extraction power generation device includes a hygroscopic solution, a hygroscopic solution reservoir, a circulation pump, a water vapor permeable barrier, a second evaporation heat exchanger, a first condensation heat exchanger, a steam ejector, a pressurized water driven generator, and condensed water reservoir. The pump supplies pressurized water flow thermally coupled to hygroscopic solution contained within reservoir. The hygroscopic solution absorbs moisture from ambient air through water vapor permeable barrier with the absorption of water, the hygroscopic solution decreases in density which causes it to rise towards the top of reservoir. Heat of ambient humidity condensation into the hygroscopic solution is coupled by second evaporation heat exchanger to the water contained within conduit. The heat of condensation of ambient humidity into solution is used as heat of evaporation of water contained within conduit to generate steam.

17 Claims, 8 Drawing Sheets

JOHNSON EJECTOR WATER AND POWER GENERATOR

CROSS-REFERENCE TO RELATED APPLICATIONS

Applicant claims the benefit of U.S. Provisional Patent Application Ser. No. 63/626,185 filed Jan. 29, 2024 and entitled “Johnson Ejector Water and Power Generator”.

SUMMARY OF THE INVENTION

The present invention uses a hygroscopic solution to condense atmospheric water in combination with a steam ejector driven distillation process to extract the water from the solution and a pressure retarded osmosis power generator to produce freshwater and electrical power. The steam ejector creates a pressure differential that enables recuperation of heat of condensation from steam exiting the distillation process for use as heat of evaporation of water from the hygroscopic solution. There are numerous applications where an inexpensive device that extracts water from the ambient atmosphere would be useful. Applications range from supplying power and water for farm irrigation, power and freshwater in geographically remote locations where power and freshwater is scarce, to reducing the grid load of buildings for HVAC and other applications. The heat to drive the process may be provided from a range of sources depending on the application including geothermal, solar or waste heat such as that released by industrial processes. The invention can be used for large scale production of drinking water in arid climates or supplying dry air to buildings, solar could be an attractive heat source. On the other hand, waste heat from cooking stoves could be used for production of water in smaller scale applications such as watering household flower plants or building dehumidification.

FIELD OF THE INVENTION

The present invention relates, in general, to an improved power generator and ambient water condenser device, system and method. More specifically, the present invention relates to improved power generation and ambient humidity condenser apparatuses, assemblies, methods, and systems having components operative in an enclosed environment wherein all components are placed in an enclosed space configured to provide potable water extracted from ambient air.

BACKGROUND OF THE INVENTION

Although the Earth’s surface is approximately seventy-one percent water, over ninety-five percent of this water is found in oceans making it non-potable. The remaining approximately fifteen percent of the Earth’s water exists as water vapor, in rivers, in lakes, in icecaps, in glaciers, in ground water, and in aquifers. With the Earth’s population exceeding seven billion people, there is an increasing need to provide sources of fresh potable water, especially in arid climates and underdeveloped areas with limited access to water.

Atmospheric humidity condensers utilizing are a known art for extracting water from the ambient atmosphere. However, many of these systems are expensive requiring bulky inefficient components operating in sizable water condensation systems. The predominant process for extracting water from ambient air is by use of electrical energy driven refrigeration cycles which consume very large amounts of energy. Other solutions include water distillation and reverse osmosis systems for harvesting water from salty ocean or sea water and fog harvesters that are used specialized membranes to collect potable water ambient air. In general, these solutions are quite cumbersome, inefficient, and expensive as well. None of them produce electricity during the condensation process. In fact, a major challenge with existing systems is associated with the large amounts of energy required for their operation. The energy challenge is made even more difficult by the existing global need to reduce dependance on fossil fuels for power generation.

Accordingly, there remains a need for improved, efficient, inexpensive atmospheric water extraction system that generates electrical power at the same time. This need and other needs are satisfied by the various aspects of the present disclosure.

DETAILED DESCRIPTION AND PREFERRED EMBODIMENT

Figure 1:
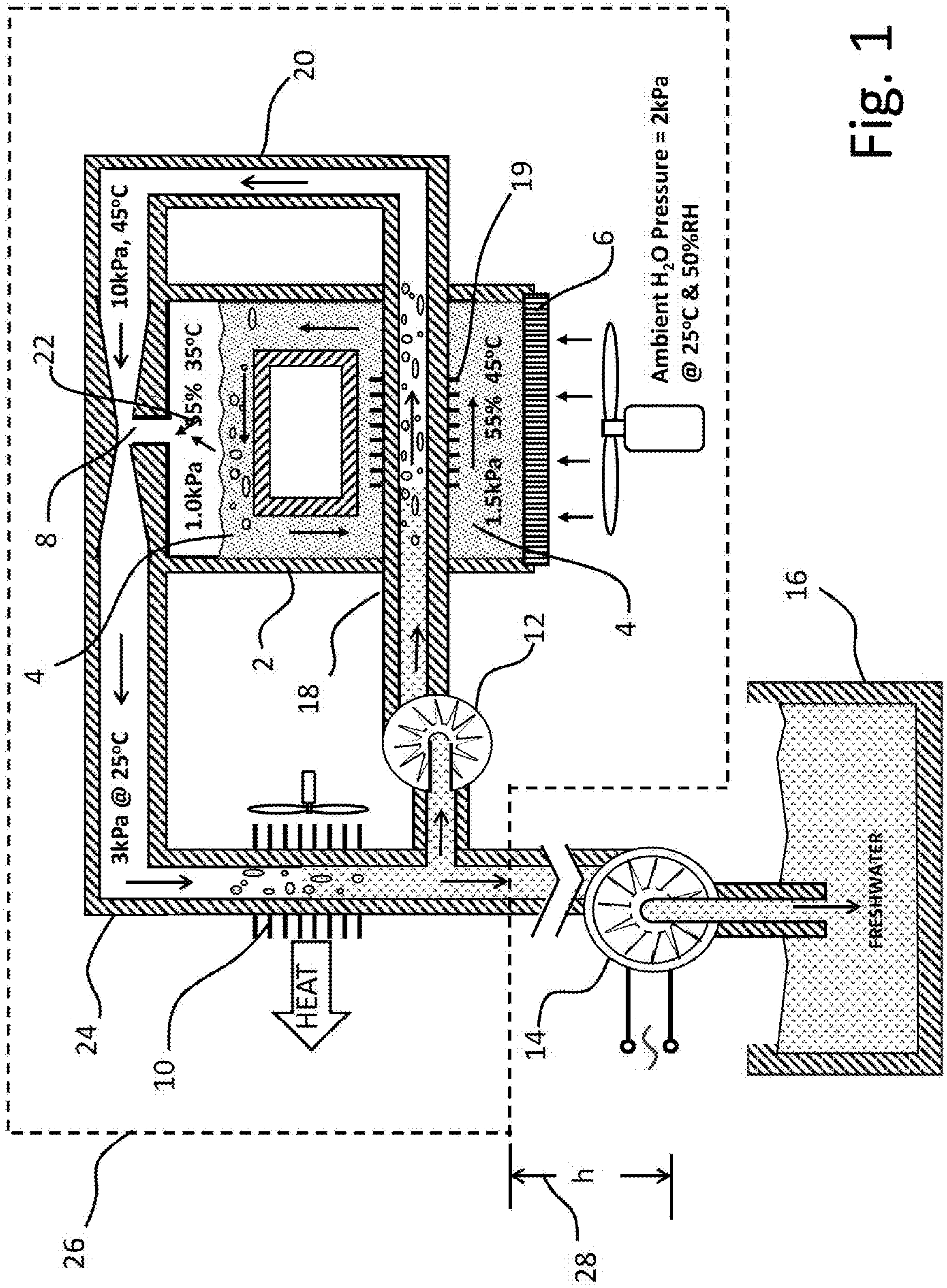
FIG. 1 is a schematic view of the atmospheric water vapor extraction power generation device embodying principles of the invention in a preferred form.

FIG. 1 shows an atmospheric water vapor extraction power generation device that is representative of the present invention. The basic device consists of hygroscopic solution 4, hygroscopic solution reservoir 2, circulation pump 12, water vapor permeable barrier 6, second evaporation heat exchanger 19, condenser heat exchanger 10, steam ejector 8, pressurized water driven generator 14, and condensed water reservoir 16.

Pump 12 supplies pressurized water flow to conduit 18 which is thermally coupled to hygroscopic solution 4 contained within reservoir 2. Hygroscopic solution 15 absorbs moisture from ambient air through water vapor permeable barrier 6. With absorption of water, the hygroscopic solution decreases in density which causes it to rise towards the top of reservoir 2. Heat of ambient humidity condensation into the hygroscopic solution is coupled by second evaporation heat exchanger 19 to the water contained within conduit 18. The heat of condensation of ambient humidity into solution 4 is used as heat of evaporation of water contained within conduit 18 to generate steam. The resulting steam is supplied to ejector 8 by conduit 20. High pressure steam supplied to ejector 8 evacuates water vapor from hygroscopic solution contained in reservoir 2, section 31 in this configuration. The resulting pressurized steam is coupled to ejector 8 by conduit 20. The flow of steam through ejector 8 creates a low pressure above solution 4 within reservoir 2 resulting in evaporation of water from the solution as indicated by arrows 22. Evaporation of water from the solution within reservoir 2 causes it to cool and increase in concentration. The solution becomes more dense and more hygroscopic. The dense solution flows back to barrier 6 where it once again absorbs ambient moisture as the process continues. The mixture of motive steam supplied by conduit 20 plus extracted steam from reservoir 2 exiting ejector 8 is supplied to condenser heat exchanger 10 by conduit 24. Pump 12 supplies a portion of the water condensed in condenser heat exchanger 10 to conduit 18 to maintain a continuous process. The additional water extracted from ambient by the hygroscopic solution is supplied to gravitational pressure head driven generator 14. Preferably, portion 26 of the invention is mounted at some height "h" above generator 14 as indicated by arrows 28. Water condensed in condenser heat exchanger 10 is supplied to water turbine 14 under gravitational pressure head. The efficiency of such a system is not limited to Carnot because the water within the column is extracted from the atmosphere at height and therefore does not have to be considered in the efficiency calculation. Solar driven ambient air circulation does the work in carrying the water to the top of the converter. The net power output depends primarily on the height above generator 14 at which section 26 is mounted. Fresh condensed water collected in reservoir 16 is available for external consumption.

Figure 2:
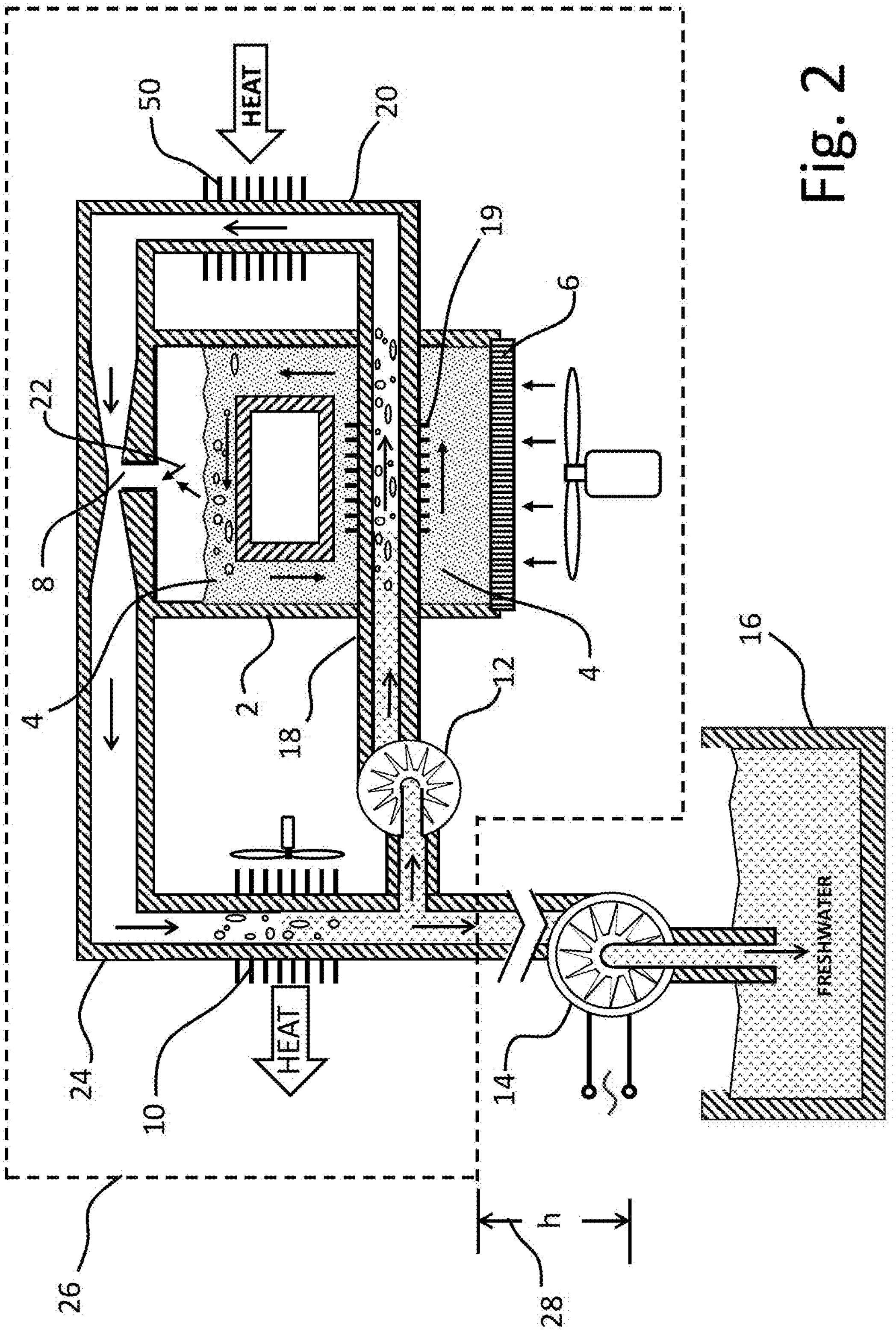
FIG. 2 is a schematic view of the atmospheric water vapor extraction power generation device embodying principles of the invention in another preferred form.

FIG. 2 illustrates the inclusion of heat source heat exchanger 50 to supply additional energy to steam supplied to ejector 8 to achieve increased performance. The higher pressure superheated steam increases the velocity through the throat of ejector 8 to achieve a greater vapor hygroscopic solution pressure differential between the absorption interface at permeable barrier 6 and its evaporation interface at ejector 8.

Figure 3:
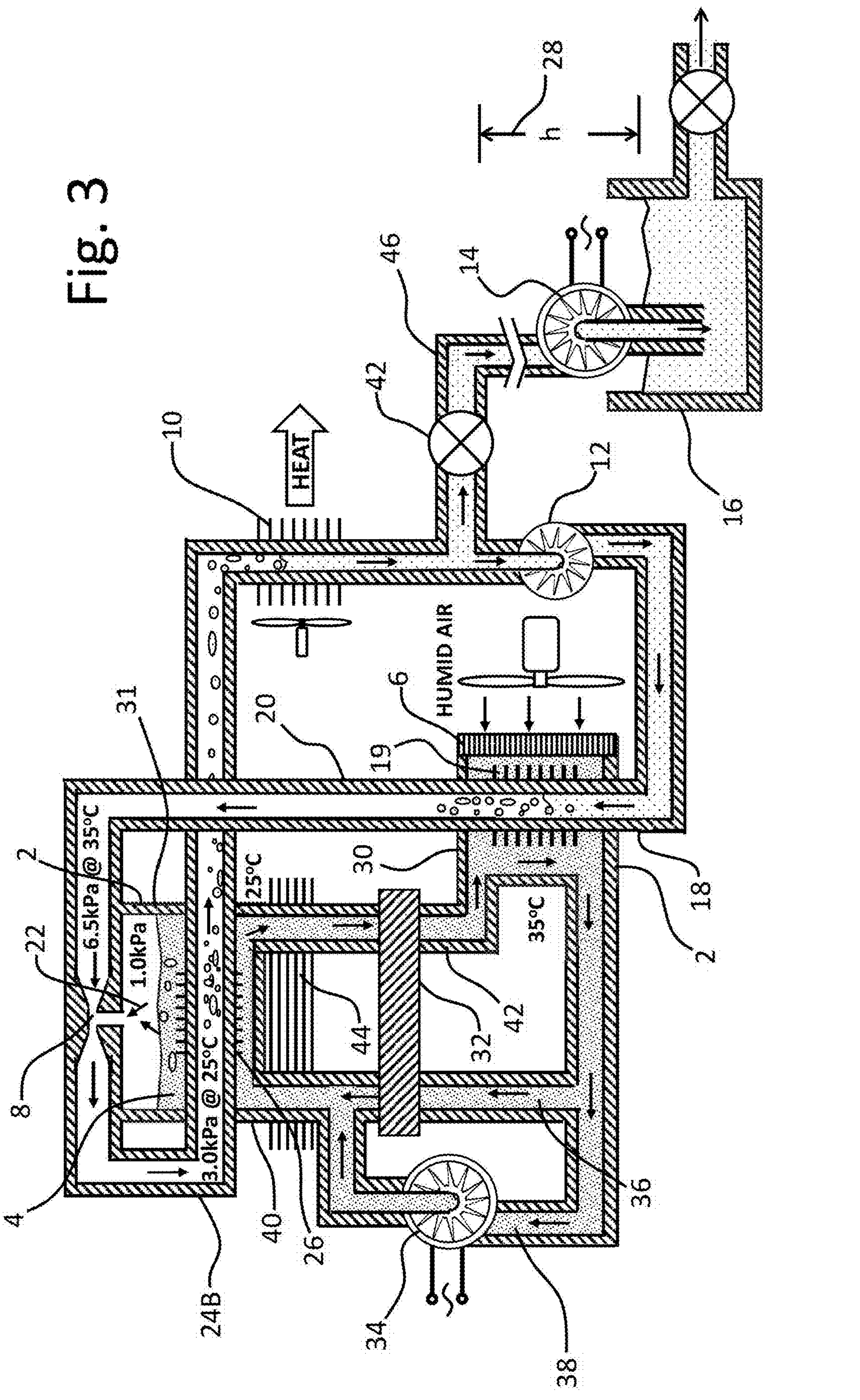
FIG. 3 is a schematic view of the atmospheric water vapor extraction power generation device embodying principles of the invention in another preferred form.

Referring now to FIG. 3, hygroscopic reservoir 2 has been expanded to include evaporation reservoir section 30 and condensation reservoir section 31 with a pressure retarded osmosis power generator coupled in between. As previously described, pump 12 supplies pressurized water through conduit 18 to hygroscopic solution 4 contained within reservoir 2, section 30 in this configuration. Heat of condensation of ambient humidity into hygroscopic solution 4 is coupled by second evaporation heat exchanger 19 to the water contained within conduit 18. The heat of condensation of ambient humidity into solution 4 is used as heat of evaporation of water contained within conduit 18 to generate steam. The resulting steam is supplied to ejector 8 by conduit 20. High pressure steam supplied to ejector 8 evacuates water vapor from hygroscopic solution contained in reservoir 2, section 31 in this configuration. Conduit 24B couples steam flow from the ejector to heat exchanger 26 which thermally couples the steam flow to the hygroscopic solution contained within section 31. In this configuration, the heat of condensation released by water condensing within conduit 18 is used as heat of evaporation for water evaporating from solution 4 contained within reservoir 2 section 31. The mixture of motive steam supplied by conduit 20 plus extracted steam from reservoir 2 exiting ejector 8 is supplied to condenser heat exchanger 10 by conduit 24. Pump 12 supplies a portion of the water condensed in condenser heat exchanger 10 to conduit 18 to maintain a continuous process. The additional water extracted from ambient by the hygroscopic solution is supplied to pressure driven generator 14. Preferably, portion 26 of the invention is mounted at some height "h" above generator 14 as indicated by arrows 28. Water condensed in condenser heat exchanger 10 is supplied to water turbine 14 under gravitational pressure head. It is subsequently available for external consumption. Electrical power and water are continuously produced as water is condensed from air passing through barrier 6 into solution 4 and subsequently extracted from solution 4 by ejector 8.

Pressure retarded osmosis driven electrical generator 34 and pressure exchanger 32 are fluidically coupled between section 30 and 31 of hygroscopic solution reservoir 2. Reservoir section 30 operates at a higher pressure relative to reservoir section 31. The pressure differential is applied across osmosis pressure generator 34 and pressure exchanger 32. An elevated pressure in condensation section 30 relative to evaporation section 31 is maintained as moisture condenses into section 31 and evaporates from section 31. Moisture entering section 30 through vapor permeable barrier 6 increases the volume of the solution contained in that section. The increased volume leaves section 30 by passing through pressure exchanger 32 and turbine generator 34. The volume of fluid flowing through conduit 32 from low section 31 through pressure exchanger 32 to section high pressure section 30 is essentially equal to the volume of solution flowing in the opposite direction, through conduit 36 from high pressure section 30 through pressure exchanger 32 to low pressure section 31 to high pressure section 30. Sufficient energy is exchanged within pressure exchanger 32 to substantially maintain the pressure differential as solution circulates between the two sections of reservoir 2. The excess volume of solution resulting from water absorption into solution 4 through water vapor permeable barrier 6 is supplied to passes through conduit 38 to generator 34. Generator 34 generates electricity operating on the pressure difference between fluid flowing therethrough from high pressure section 30 to low pressure section 31.

Water condensed within heat exchanger 12 is supplied to water pressure generator 14 under gravitational pressure head produced at water column height h as indicated by arrows 28. The efficiency of such a system is not limited to Carnot because the water within the column is extracted from the atmosphere at height and therefore, does not have to be considered in the efficiency calculation. The solar driven ambient air circulation does the work in carrying the water to the top of the converter.

Figure 4:
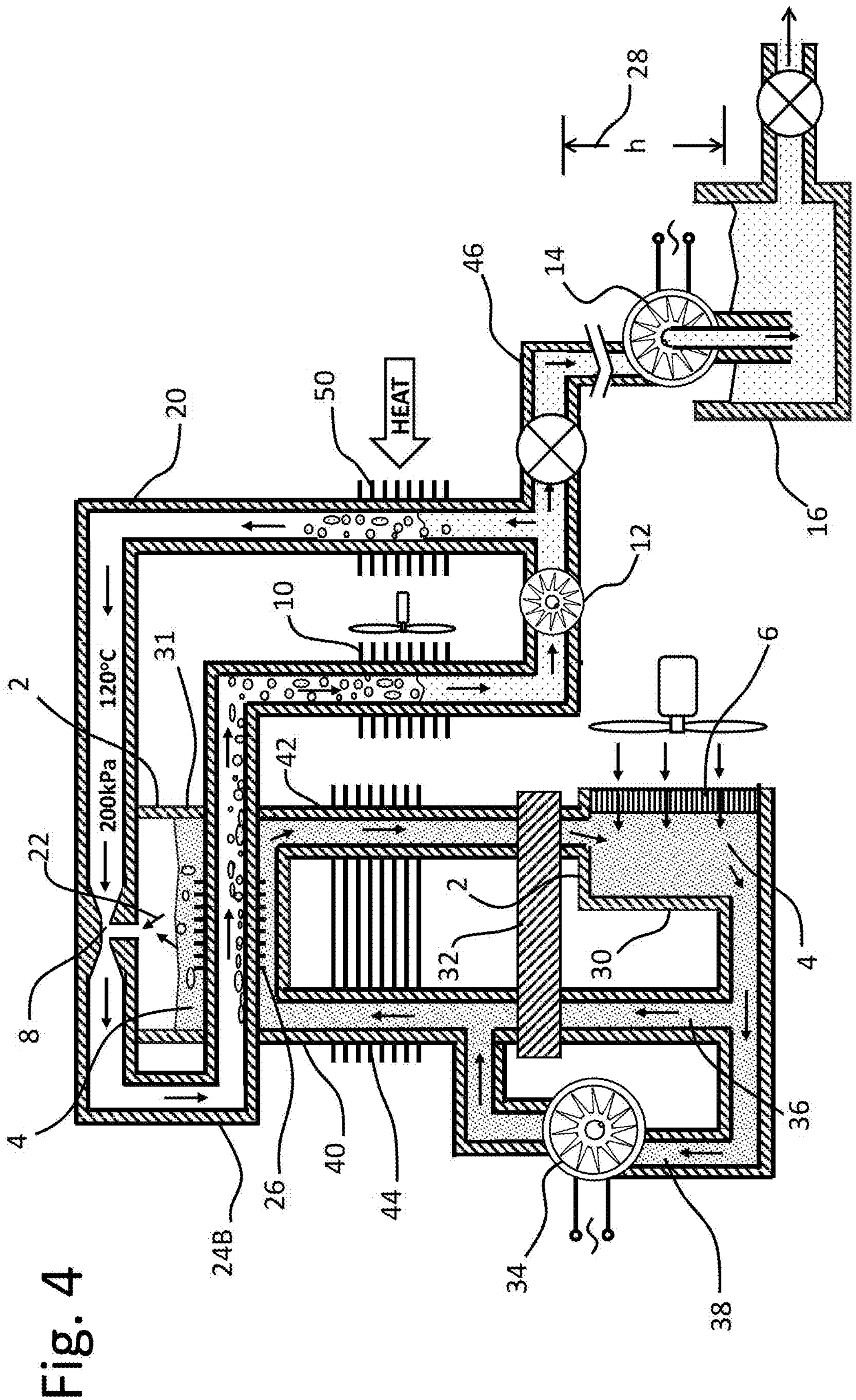
FIG. 4 is a schematic view of the atmospheric water vapor extraction power generation device embodying principles of the invention in another preferred form.

FIG. 4 shows an embodiment of the invention for atmospheric water vapor extraction power generator that operates on a heat source heat exchanger 50. It includes hygroscopic solution 4, hygroscopic solution reservoir 2, pressure exchanger 32, pressurized fluid powered generator 34, recuperative heat exchanger 44, ejector 8, condenser heat exchanger 10, heat source heat exchanger 50 and pump 12. Hygroscopic solution circulation conduits 40 and 42 couple hygroscopic solution flow between low pressure section 31 and high-pressure section 30 of reservoir 2. Conduit 40 couples flow from section 30 through pressure exchanger 32 and generator 34 to section 31. Conduit 42 couples flow from section 31 through pressure exchanger 32 to section 30. Conduits 40 and 42 carry their respective flows through recuperative heat exchanger 44. The water and power generator further includes a freshwater circulation loop that includes pump 12, heat source heat exchanger 50, conduit 20, ejector 8, conduit 24B, heat exchanger 26, and condenser heat exchanger 10.

During operation, pressure exchanger 32 supplies concentrated (water depleted), pressurized, hygroscopic solution 4 to high pressure section 30 of reservoir 2. Water vapor permeable barrier 6 functions as a solution to ambient interface. Solution 4 attracts water vapor from ambient through water vapor permeable barrier 6. The volume of the pressurized solution increases as ambient water vapor condenses into it. The absorption results in sufficient pressurized solution volume to power pressure exchanger 32 to continuously repressurize water depleted solution leaving section 31 as well as power pressure driven generator 34. Low-pressure, diluted (water rich) solution leaving generator 34 and exchanger 32 is supplied by conduit 40 to low pressure section 31 of reservoir 2.

Pump 12 supplies pressurized water to heat source heat exchanger 50 whereby the water is converted into steam and supplied at high pressure through conduit 20 to ejector 8. Steam flow through the throat of ejector 8 creates low pressure which draws vapor from water rich solution contained in section 31 of reservoir 2 to maintain a low pressure therein. Steam exiting ejector 8 slows to low speed and increases in pressure as it enters conduit 24B. The increased pressure steam condenses inside recuperative heat exchanger 26 as its heat of condensation is transferred to hygroscopic solution 4 in section 31 for consumption as heat of evaporation of steam therefrom. Ejector 8 evaporates water from the low vapor pressure hygroscopic solution and condenses it at the higher pressure of freshwater contained in heat exchanger 26. Remaining steam leaving heat exchanger 26 condenses as it passes through condenser heat exchanger 10 with its heat of condensation being rejected to ambience. The resulting fully liquid fresh water is supplied to pump 12 and the resulting water depleted hygroscopic solution is pumped to high pressure by pressure exchanger 32 and supplied to section 30 of reservoir 2 as the process continues.

Figure 5:
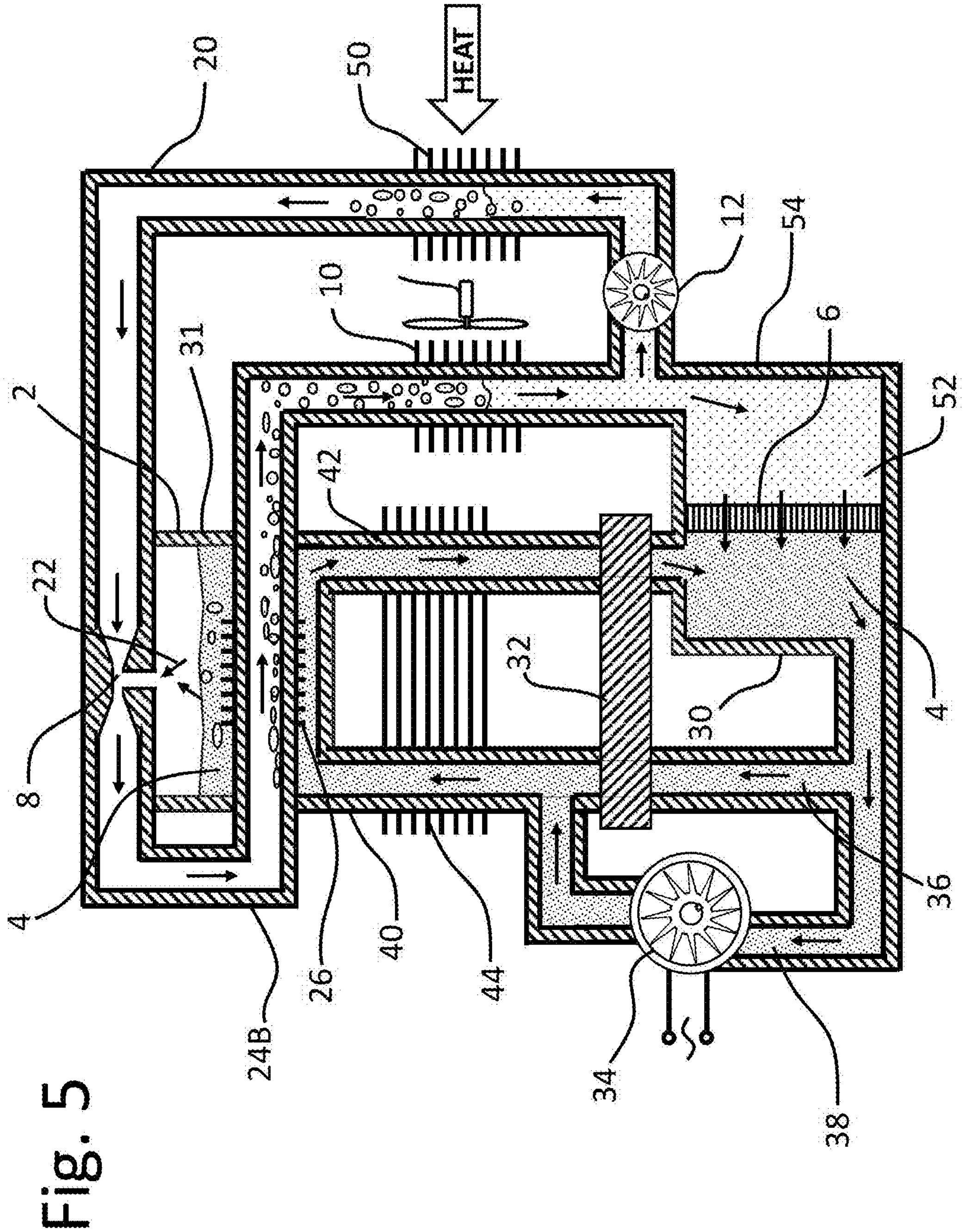
FIG. 5 is a schematic view of the atmospheric water vapor extraction power generation device embodying principles of the invention in another preferred form.

FIG. 5 shows a closed configuration of the invention that does not utilize ambient water vapor or output freshwater. Fresh water reservoir 54 is fluidically coupled between water permeable barrier 6 and condenser heat exchanger 10. Except for the addition of reservoir 54, the components of invention operate as previously described. Reservoir 54 supplies freshwater extracted from solution 4 by ejector 8 back to high pressure solution 4 contained in reservoir section 30 for reabsorption. In this configuration, the invention functions as a heat engine operating on heat input at the temperature of heat source heat exchanger 50 and heat rejection and the temperature of condenser heat exchanger 10 to produce the electrical power output by generator 34.

Figure 6:
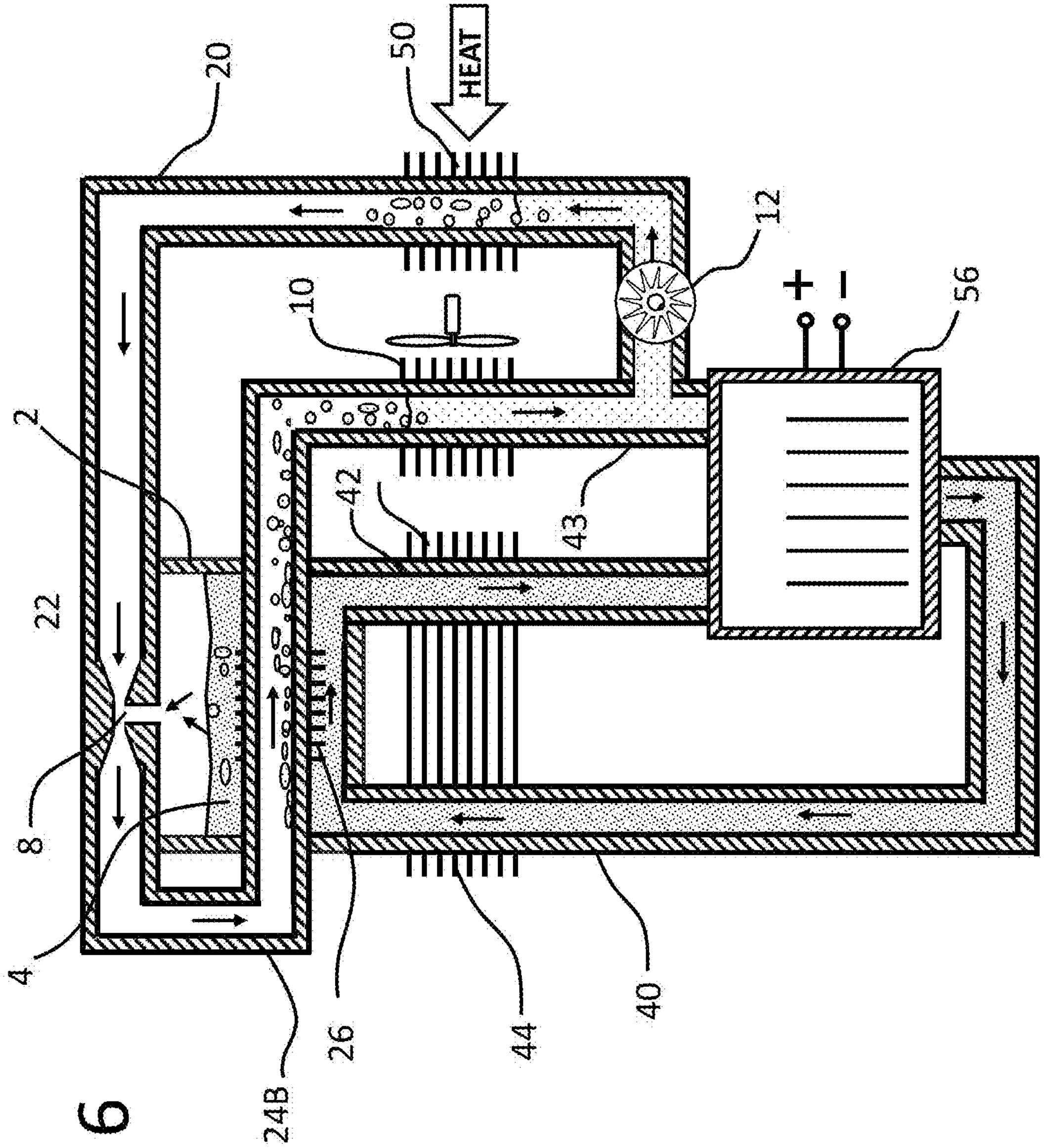
FIG. 6 is a schematic view of the atmospheric water vapor extraction power generation device embodying principles of the invention in another preferred form.

FIG. 6 illustrates a configuration of the invention where the pressure retarded osmoses generator is replaced by a reverse electrodialysis converter that generates power from water concentration difference between concentrated (water depleted) hygroscopic solution supplied by conduit 42 and freshwater (substantially pure water) supplied condenser heat exchanger 10. The mixed solution that results from the power generation process is supplied to hygroscopic solution reservoir 2 by conduit 40.

Figure 7:
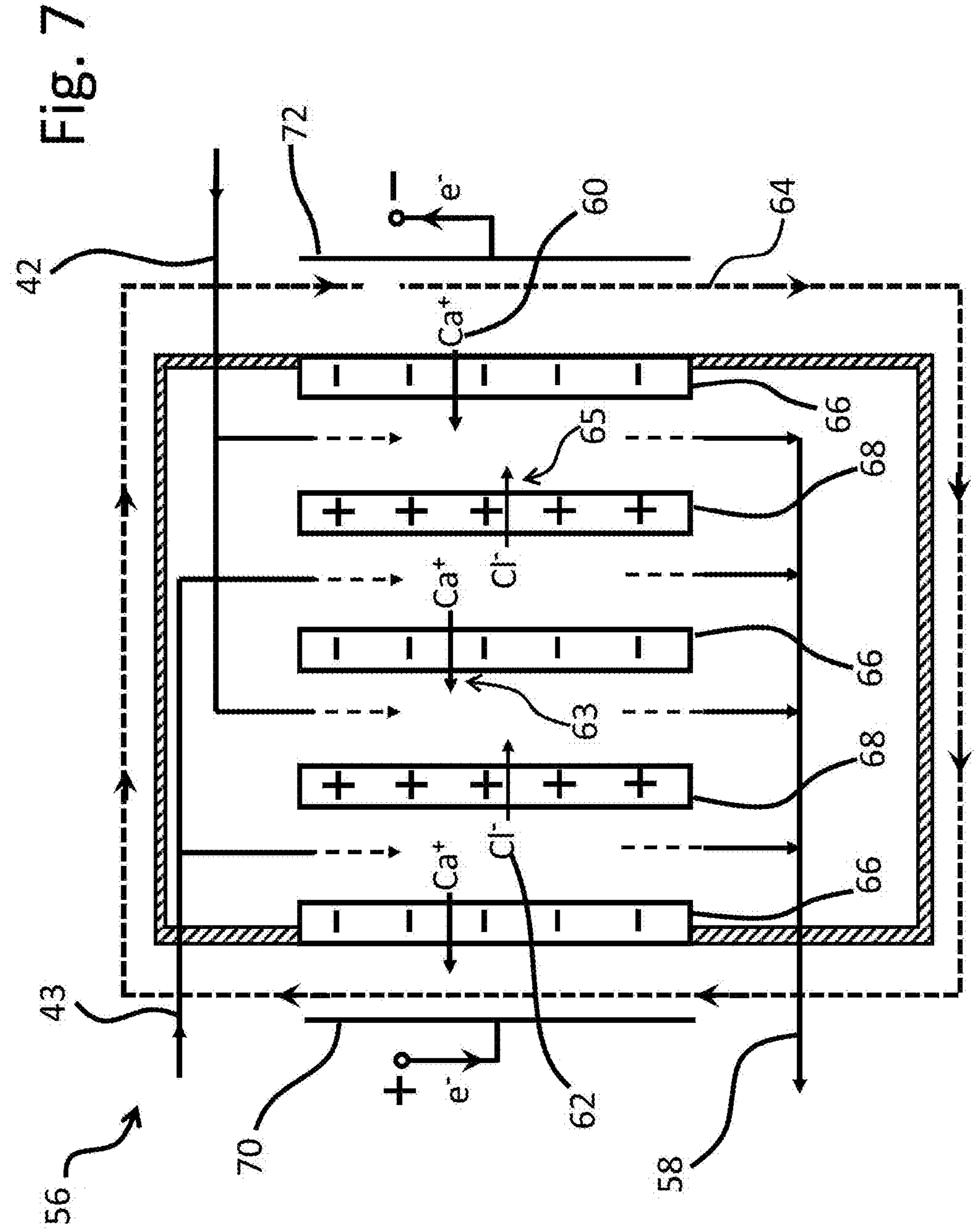
FIG. 7 is a schematic view of the atmospheric water vapor extraction power generation device embodying principles of the invention in another preferred form.

FIG. 7 illustrates operation of a representative reverse electrodialysis cell representative of cell 52. In this example, the hygroscopic solution is aqueous calcium chloride (CaCl: $H_2O$). Positive ion conductors 66 and negative ion conductors 68 are interleaved to form the electrodialysis stack. For a given application, the number of interleaved conductors are selected to achieve a desired voltage. As illustrated, conduit 43 supplies concentrated salt solution to the space between electrode pairs sequenced with a negative electrode 66 to the left and a positive electrode 68 to the right. On the other hand, conduit 42 supplies substantially pure water to the space between pairs sequenced with a negative electrode 66 to the right and a positive electrode 68 to the left. A voltage potential is generated with current under the salt concentration differential as positive calcium ions 60 and negative chlorine ions 62 are conducted through positive ion conductors 66 and negative ion conductors 68 respectively. Electrolyte 64 is circulated between electrodes 70 and 72 to maintain concentration equilibrium between the two electrodes.

Figure 8:
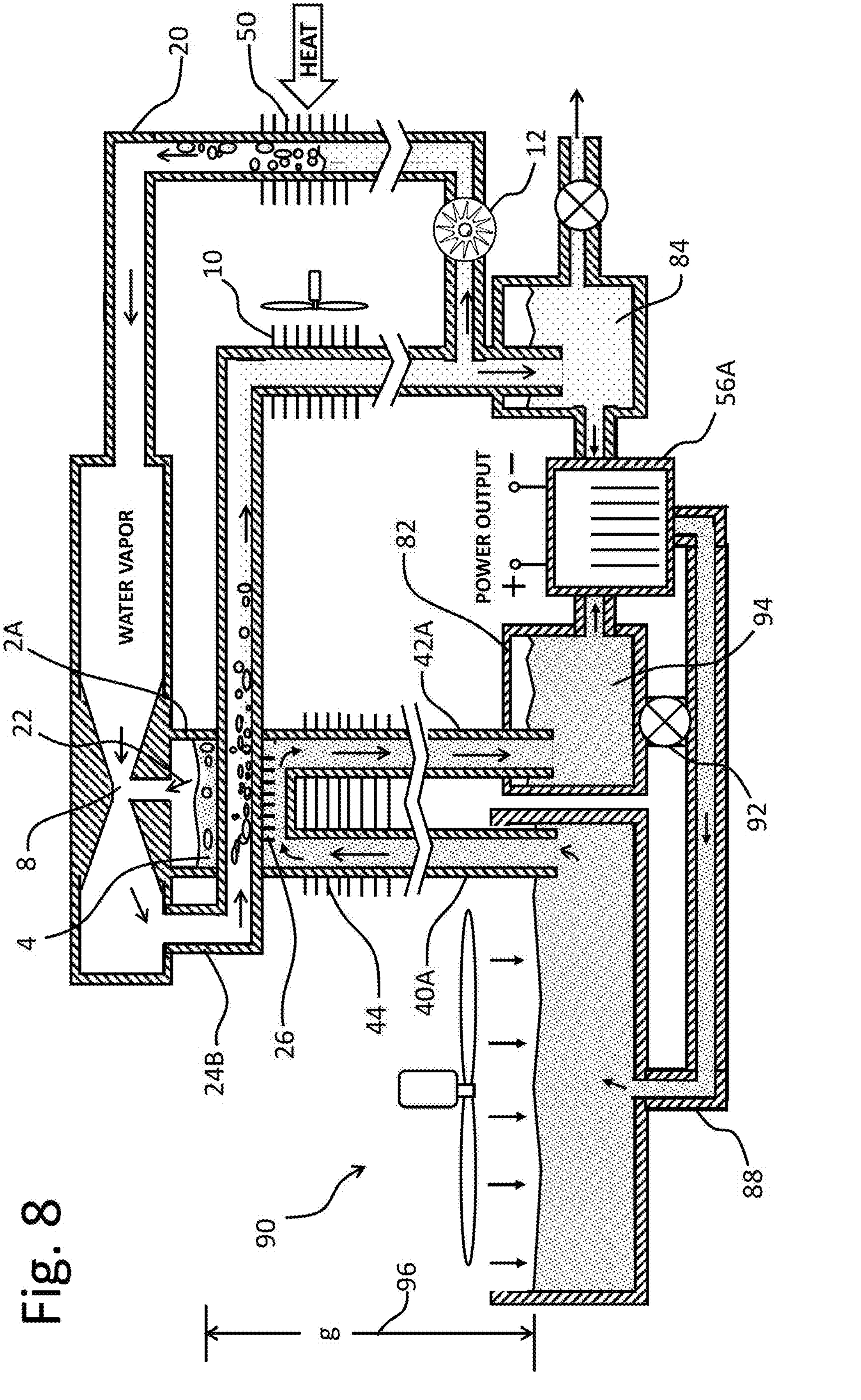
FIG. 8 is a schematic view of the atmospheric water vapor extraction power generation device embodying principles of the invention in another preferred form.

FIG. 8 shows an embodiment of the invention for atmospheric water vapor extraction power generator that operates on heat source heat exchanger 50. Reverse electrodialysis (RED) cell 56A generates electrical power from the salt concentration differential between freshwater and concentrated hygroscopic salt solution. It includes hygroscopic solution 4, hygroscopic solution reservoir 2A, pressure exchanger 32, pressurized fluid powered generator 34, recuperative heat exchanger 44, ejector 8, condenser heat exchanger 10, heat source heat exchanger 50 and pump 12. It further includes concentrated solution reservoir 82, aeration reservoir 90 reverse electrodialysis stack 56A and freshwater storage reservoir 84.

Conduit 42A couples water depleted solution flow from evaporation reservoir 2A through heat exchanger 44 to concentrated solution reservoir 82. Conduit 40A couples water rich solution flow from aeration reservoir 90 through heat exchanger 44 to evaporation reservoir 2A. The water and power generator further includes a freshwater circulation loop that includes pump 12, heat source heat exchanger 50, conduit 20, ejector 8, conduit 24B, heat exchanger 26, and condenser heat exchanger 10.

During operation, solution 4 attracts and condenses water vapor from ambient air while flowing through aerator 90. The resulting water rich, lower density solution 4 flows through conduit 40A to evaporation chamber 2A.

Pump 12 supplies pressurized water to heat source heat exchanger 50 whereby the water is converted into steam and supplied at high pressure through conduit 20 to ejector 8. Steam flow through the throat of ejector 8 creates low pressure which draws vapor from water rich solution contained in section 31 of reservoir 2 to maintain a low pressure therein. Steam exiting ejector 8 slows to low speed and increases in pressure as it enters conduit 24B. The increased pressure steam condenses inside recuperative heat exchanger 26 as its heat of condensation is transferred to hygroscopic solution 4 in reservoir 2A for consumption as heat of evaporation of steam therefrom. Ejector 8 evaporates water from the low vapor pressure hygroscopic solution and condenses it at the higher pressure of freshwater contained in heat exchanger 26. Any remaining steam leaving heat exchanger 26 condenses as it passes through condenser heat exchanger 10 as its heat of condensation is rejected to ambience. The resulting fully liquid fresh water is supplied to reservoir 84 where it accumulates with a portion of it drawn off by pump 12 as the process continues. The process results in accumulation and storage of fresh water within reservoir 84 as water vapor is condensed from ambient. The resulting water depleted concentrated hygroscopic solution leaving evaporation reservoir 2A is coupled through conduit 42A to concentrated solution reservoir 82 where it is accumulated and stored. Water depleted (concentrated) hygroscopic salt solution 94 and condensed (substantially pure)

water from reservoir 84 are supplied to reverse electrodialysis cell stack 56A. Stack 56A uses the salt concentration differential to generate electrical power. The less concentrated solution resulting from the process is supplied by conduit 88 back to aeration reservoir 90 to capture more moisture. Excess water can be made available for external use by activating valve 92 to bypass the RED stack 56A to supply depleted solution directly to aeration reservoir 90 so that freshwater accumulated in reservoir 84 can be off boarded for other use. The configuration has the additional benefit of energy storage capacity. Fresh water and concentrated salt solution accumulates within reservoirs 84 and 82 respectively can be stored and drawn out on an as needed bases to generate power.

I claim:

1. A freshwater generator comprising:

a hygroscopic solution;

an ejector;

a water permeable barrier, and a supply of steam, wherein the hygroscopic solution is circulating between the water permeable barrier and the ejector, whereby the hygroscopic solution absorbs moisture through the water permeable barrier and releases the moisture to the ejector, the ejector being driven by the supply of steam to extract a water vapor from the hygroscopic solution, and the water permeable barrier permitting freshwater to enter into the hygroscopic solution while preventing a passage of the hygroscopic solution therethrough.

2. The freshwater generator as disclosed by claim 1 wherein the freshwater generator further includes a reverse electrodialysis electrical power generator, the hydroscopic solution resulting from extraction of the freshwater therefrom by the ejector being supplied to the electrodialysis generator, the freshwater extracted by the ejector being supplied to the electrodialysis generator, the electrodialysis generator operating power using the hygroscopic solution concentration differential between the fresh water and the hygroscopic solution.

3. The freshwater generator as disclosed by claim 2 wherein the hydroscopic solution resulting from the freshwater extraction by the ejector is stored in a concentrated solution storage reservoir and the freshwater extracted by the ejector is stored in a freshwater storage reservoir, the freshwater and the hygroscopic solution being supplied to the electrodialysis generator when power is needed.

4. The freshwater generator as disclosed by claim 1 wherein the freshwater generator further includes a condensation heat exchanger, the condensation heat exchanger being coupled to the exit of the ejector and operating to remove heat of condensation from the steam passing therethrough for condensation thereof.

5. The freshwater generator as disclosed by claim 4 wherein the freshwater generator further includes a pressurized water flow driven electric power generator, the pressurized water flow driven electric power generator being coupled to the heat exchanger and positioned a distance below the heat exchanger such that the freshwater condensed in the heat exchanger is supplied to the pressurized water flow driven electric power generator under a gravitational pressure head.

6. The freshwater generator as disclosed by claim 1 wherein the freshwater generator further includes an evaporation heat exchanger, the evaporation heat exchanger being coupled to the hygroscopic solution and coupling water flow therethrough from a pump whereby a heat of evaporation of freshwater therein is supplied by the freshwater condensing into the hygroscopic solution from ambient.

7. The freshwater generator as disclosed by claim 2 wherein the freshwater generator further includes a source heat exchanger, a evaporation heat exchanger being coupled to the hygroscopic solution and coupling the freshwater flow therethrough from a pump whereby heat of evaporation of the freshwater therein condensing into the hygroscopic solution from ambient.

8. The freshwater generator as disclosed by claim 7 wherein the freshwater generator further includes a evaporation heat exchanger, the heat exchanger being coupled between the hygroscopic solution and a freshwater pump whereby ambient humidity condensing into the hygroscopic solution transfers heat of evaporation to the hygroscopic solution to evaporate water therefrom as the water vapor is extracted by the ejector.

9. The freshwater generator as disclosed by claim 1 wherein the water permeable barrier couples the hygroscopic solution to ambient air whereby the hygroscopic solution absorbs ambient humidity.

10. The freshwater generator as disclosed by claim 1 wherein the water permeable barrier couples the hygroscopic solution to the freshwater extracted by the ejector.

11. A freshwater generation comprising:

an ejector;

a pressure exchanger;

a supply of steam;

a hygroscopic solution;

a pressure retarded osmosis barrier, and a pressurized water flow driven electric power generator, wherein the hygroscopic solution is circulating between the pressure retarded osmosis barrier and the ejector, whereby the pressure osmosis barrier extracts moisture through the pressure retarded osmosis barrier and releases the moisture to the ejector, the ejector being driven by the supply of steam to extract a water vapor from the hygroscopic solution, a water permeable barrier permitting water enter into the hygroscopic solution from while preventing a passage of the hygroscopic solution therethrough, the pressure exchanger and the pressurized water flow driven electric power generator being coupled between the ejector with a solution pressure differential being applied across both the pressure exchanger and the pressurized low driven electric power generator, the water permeable barrier supplying water to the higher pressure side of the pressurized water flow driven electric power generator and the pressure exchanger, condensing into the hygroscopic solution increases the volume thereof to a level sufficient to maintain the pressure differential an generate electrical power.

12. The freshwater generator as disclosed by claim 11 wherein the freshwater generator further includes a recuperative heat exchanger, the recuperative heat exchanger being coupled to the hygroscopic solution and the exit of the ejector and coupling heat from the supply of steam leaving the ejector to the hygroscopic solution whereby the exiting the supply of steam condenses as the supply of steam transfers heat of evaporation to the hygroscopic solution to evaporate water therefrom as the water vapor is extracted by the ejector.

13. The freshwater generator as disclosed by claim 11 wherein the freshwater generator further includes a condensation heat exchanger, the condensation heat exchanger being coupled to the exit of the ejector and operating to remove heat of condensation from the supply of steam passing therethrough for condensation thereof.

14. The freshwater generator as disclosed by claim 11 wherein the freshwater generator further includes a source heat exchanger, the second heat exchanger being coupled to the hygroscopic solution and coupling water flow therethrough from the pump whereby heat of evaporation of water therein is supplied by water condensing into the hygroscopic solution from ambient.

15. The freshwater generator as disclosed by claim 11 wherein the freshwater generator further includes the pressurized water flow driven electric power generator, the pressurized water flow driven electric power generator being coupled to a heat exchanger and positioned a distance below the heat exchanger such that water condensed in heat exchanger is supplied to the pressurized water flow driven electric power generator under a gravitational pressure head.

16. The freshwater generator as disclosed by claim 11 wherein the water permeable barrier couples the hygroscopic solution to ambient air whereby the hygroscopic solution absorbs ambient humidity.

17. The freshwater generator as disclosed by claim 11 wherein the water permeable barrier couples the hygroscopic solution to water extracted by the ejector.

* * * * *